March 19, 1929.    C. W. BECK    1,705,746
MOLDING
Filed Oct. 5, 1925    2 Sheets-Sheet 1
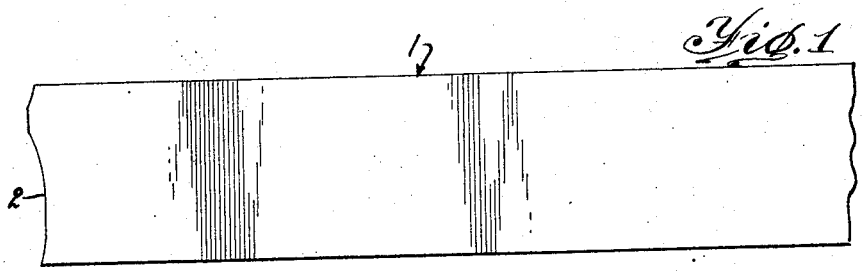
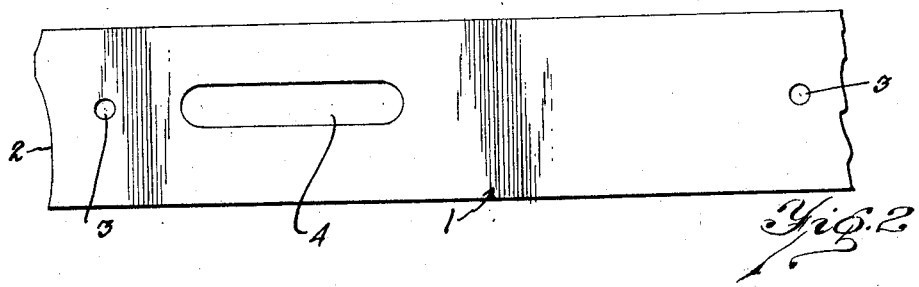
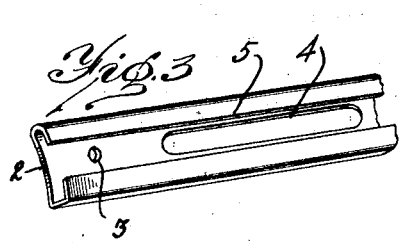
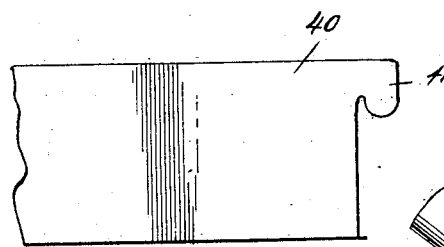
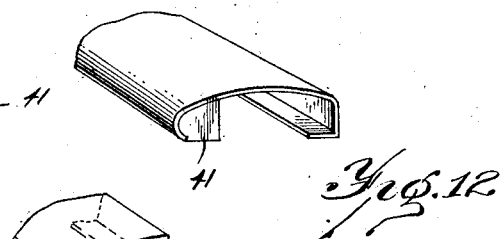
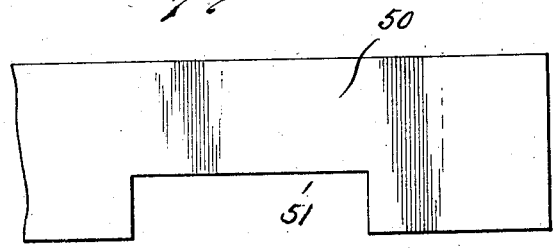
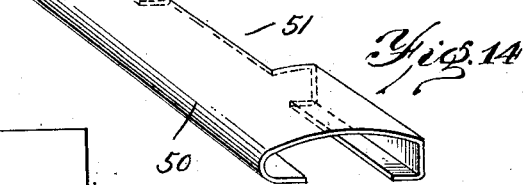
INVENTOR.
Charles W. Beck
BY
ATTORNEY.

March 19, 1929.  C. W. BECK  1,705,746
MOLDING
Filed Oct. 5, 1925  2 Sheets-Sheet 2
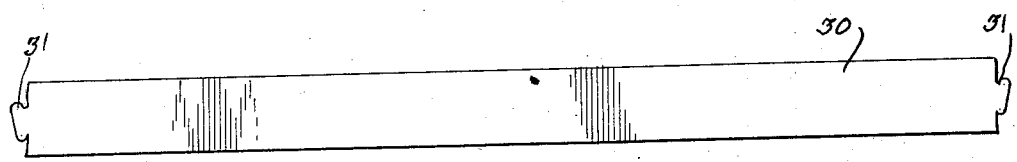
Fig. 7
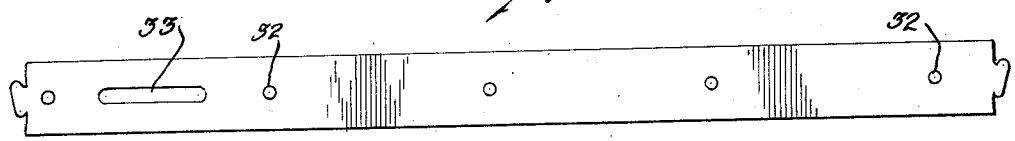
Fig. 8
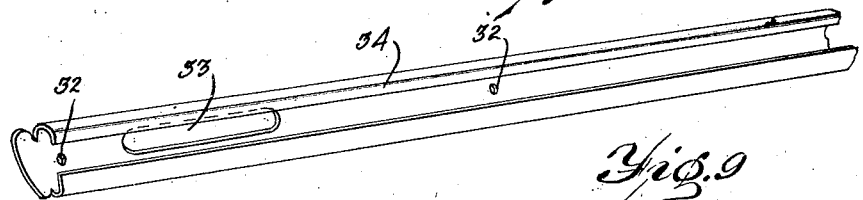
Fig. 9
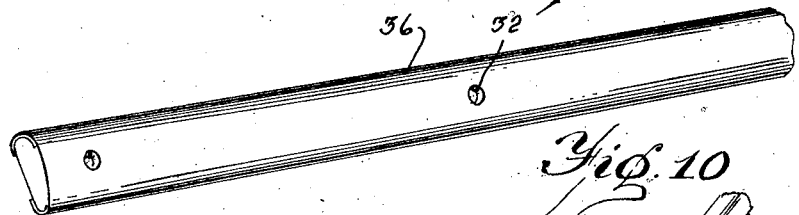
Fig. 10
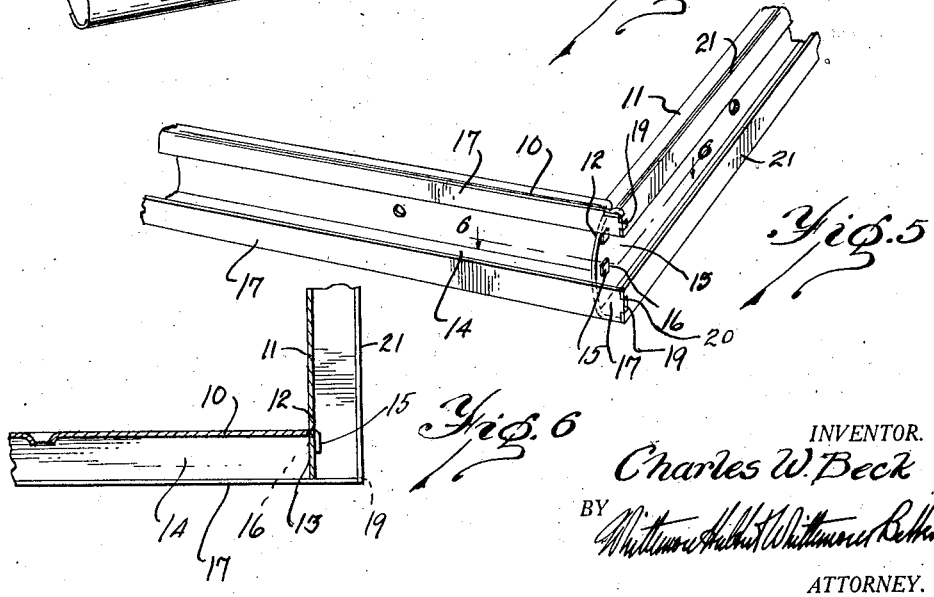
Fig. 5
Fig. 6
INVENTOR.
Charles W. Beck
BY
ATTORNEY.

Patented Mar. 19, 1929.

1,705,746

UNITED STATES PATENT OFFICE.

CHARLES W. BECK, OF TOLEDO, OHIO, ASSIGNOR TO BECK-FROST CORPORATION, OF DETROIT, MICHIGAN, A CORPORATION OF MICHIGAN.

MOLDING.

Application filed October 5, 1925. Serial No. 60,575.

This invention relates generally to the manufacture of molding and refers more particularly to the manufacture of metal molding designed for use on the doors and windows of vehicle bodies.

One of the essential objects of the invention is to provide a neat and attractive strip of molding that is strong and durable in construction and can be easily and quickly formed from a sheet metal blank.

With the above and other objects in view the invention consists in certain novel features of construction as will be more fully described and particularly pointed out in the appended claims.

In the accompanying drawing:

Figure 1 is a top plan view of a blank from which the channel molding is formed.

Figure 2 shows the blank after the punch operation.

Figure 3 shows the molding after being formed into channel-shape.

Figure 4 shows the finished molding with the countersunk openings.

Figure 5 shows a molding joint.

Figure 6 is a sectional view taken on the line 6—6 of Figure 5.

Figure 7 shows a top plan view of a modified form of blank.

Figure 8 shows the modified blank after the punch operation.

Figure 9 shows the modified molding after being formed into channel-shape.

Figure 10 shows the finished strip of molding which is formed from the joint shown in Figure 5.

Figure 11 is a top plan view of another modified form of blank.

Figure 12 is an end view of the finished molding formed from the blank shown in Figure 11.

Figure 13 is a top plan view of still another modified form of blank.

Figure 14 is a fragmentary perspective view of the finished molding which is formed from the blank shown in Figure 13.

Heretofore channel shaped metal moldings have been formed by rolling a long flat strip of sheet metal of uniform width, then cutting it into suitable lengths and otherwise shaping the molding into the desired form. With certain applications of the moldings it has been desirable to provide the ends of the molding with coped ends. In other applications of the molding it has been desirable to close all or part of the ends of the moldings. Inasmuch as the cutting operation occurred after the channeling operation it has been necessary to use a band saw or similar device to form the coped ends or to use expensive dies and tools which would not stand up very long. This was an exceedingly slow and expensive operation and therefore materially retarded production. For closing all or part of the ends of the moldings it has heretofore been the practice of making a short plug to fit either on one side or across the entire inside of the molding and then spot welding it to hold it in place. Moreover inaccuracies often occurred.

With the present invention the blank 1 of the desired length having coped ends 2 is formed by cutting the same from a suitable strip of sheet metal stock. The blank 1 is then subjected to a punching operation to form the spaced openings 3 and the slot 4. Some of the moldings are used without holes or openings of any kind therein. The blank 1 is preferably rolled into a channel-shaped strip 5 of molding of the desired cross section, whereupon the openings 3 are countersunk as shown. Thus, it will be apparent that the finished molding 6 may be quickly and accurately formed. Moreover the ends of the channel molding are coped or shaped prior to the rolling operation, hence this method obviates entirely the use of the band saw referred to above for cutting a long channel strip to provide several strips of molding of the desired length having coped ends.

In Figures 5 and 6 respectively I have shown a slight modification in which two strips 10 and 11 respectively of channel-shaped molding are rigidly and permanently secured together. To provide a neat joint, one end of the strip 10 is coped as shown at 12 and fits the transversely curved base 13 of the molding 11. As shown, the base 14 of the channel molding 10 is provided at one end with spaced lugs 15 which extend through suitable slots 16 in the base 13 of the channel molding 11 and are bent against the inner face of the base 13, while the flanges 17 of the channel molding 10 preferably projects beyond the coped end 12 and are provided at their outer ends with tongues 19 which are preferably riveted in suitable slots 20 in the flanges 21 of the molding 11.

To facilitate assembly, the strips 10 and 11 respectively of molding are preferably provided with interchangeable ends. As shown, one end of each strip is preferably provided with the tongues 15 and 19 respectively, while the opposite end thereof is preferably provided with the slots 16 and 20 respectively.

In Figures 7 to 10 inclusive I have shown another modification in which a blank 30 of the desired length having tongues 31 at the opposite ends thereof is stamped from a suitable strip of sheet metal stock. This blank 30 may then be subjected to a punching operation to form the spaced openings 32 and the slot 33. The blank 30 is then preferably rolled into a channel-shaped strip of molding 34 of the desired cross section, whereupon the tongues 31 are bent inwardly to close the ends of the channel, and finally the openings 32 if desired are countersunk as shown to provide the finished molding 36.

In Figures 11 and 12 of the drawings I have shown still another modification in which a blank 40 is provided at each end with a tongue 41. After this blank is rolled into channel form, each tongue 41 is bent inwardly as shown in Figure 12.

In Figures 13 and 14 I have shown still another modification in which a blank 50 is provided at one end with a suitable slot 51. Thus, when the blank 50 is rolled into channel form, this slot 51 will be wide enough to receive the usual operating handle or lever (not shown) carried by the door.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A molding joint including a strip having a transversely curved face and a slot, and a second strip having a coped end fitting the curved face of the first strip and having a tongue projecting from the base thereof, riveted in the slot aforesaid.

2. A molding joint including a channel-shaped strip having a transversely curved base and a slot in said base, and a second strip having a coped end fitting the curved base of the first strip and having a tongue projecting from the base thereof engaging the slot aforesaid.

3. A molding joint including a channel-shaped strip having a transversely curved base and a flange projecting beyond an end of said base, and a second strip having a coped end fitting the transversely curved base of the first strip and having a tongue secured to the flange aforesaid.

4. A molding joint including a channel-shaped strip having a projecting flange at one end provided with a slot, and a second strip extending at substantially right angles to the first strip having a tongue riveted in the slot aforesaid.

5. A molding joint including a channel-shaped strip having a transversely curved base provided with a slot and having a projecting flange provided with a slot, and a second strip having a coped end fitting the transversely curved base of the first strip, a tongue projecting from the base of the second strip engaging the slot in the base of the first strip, and a flange projecting from the second strip provided with a tongue engaging the slot in the flange of the first strip.

6. A channel-shaped strip of molding having a tongue projecting therefrom at one end thereof for engagement with a slot in a second strip of molding and having a slot at the opposite end thereof adapted to receive a tongue projecting from another strip of molding.

7. A channel-shaped strip of molding having a transversely curved base, tongues projecting from said base at one end thereof for engagement with slots in a second strip of molding, said base having slots at the end opposite the tongues adapted to engage tongues projecting from another strip of molding.

8. A substantially channel-shaped strip of molding having a transversely curved base and a tongue projecting from and extending transversely of one end of the base to close one end of the channel.

9. A channel-shaped strip of molding terminating at the longitudinal edges thereof in inwardly extending flanges and tongues projecting from said flanges at one end thereof adapted to be secured to a second strip of molding.

10. A channel-shaped strip of molding having a transversely curved base and terminating at the longitudinal edges thereof in inwardly extending flanges, and tongues projecting from the flanges and base aforesaid of the strip adapted to be secured to a second strip of molding.

11. A channel-shaped strip of molding terminating at the longitudinal edges thereof in inwardly extending flanges, said flanges projecting beyond the base of the channel and having tongues projecting therefrom adapted to be secured to a second strip of molding.

12. A channel-shaped strip of molding having a transversely curved base portion, and tongues projecting from said base portion adapted to be secured to a second strip of molding.

13. A garnish molding for vehicle bodies comprising a channel shaped strip provided at the edges of the channel with inturned flanges and provided at one end of said strip with a transversely extending tongue that partially closes one end of the channel.

14. A garnish molding for vehicle bodies comprising a channel-shaped strip having a tongue extending transversely thereof at one end of the channel and partially closing the said end of said channel.

In testimony whereof I affix my signature.

CHARLES W. BECK.